United States Patent
Kim et al.

(10) Patent No.: US 6,788,731 B2
(45) Date of Patent: Sep. 7, 2004

(54) FLEXIBLE CORRELATION AND QUEUEING IN CDMA COMMUNICATION SYSTEMS

(75) Inventors: Yun Kim, Hoffman Estates, IL (US); David P. Gurney, Carpentersville, IL (US); Anthony R. Schooler, Bartlett, IL (US); Zhuan Ye, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 85 days.

(21) Appl. No.: 10/133,149

(22) Filed: Apr. 26, 2002

(65) Prior Publication Data

US 2003/0202569 A1 Oct. 30, 2003

(51) Int. Cl.[7] ............................................. H04L 27/30
(52) U.S. Cl. ....................... 375/142; 375/150; 375/343; 711/5; 711/150; 711/153
(58) Field of Search ................................. 375/140–142, 375/150, 261, 343, 340, 372; 370/320, 335, 342, 441, 378, 379, 381, 382, 479; 711/2, 5, 102–105, 149, 150, 153, 154, 163, 173, 211, 214, 217

(56) References Cited

U.S. PATENT DOCUMENTS

| 4,933,952 | A | 6/1990 | Albrieux et al. |
|---|---|---|---|
| 6,044,105 | A | 3/2000 | Gronemeyer |
| 6,157,684 | A | 12/2000 | Yang et al. |
| 6,175,561 | B1 * | 1/2001 | Storm et al. ................. 370/342 |
| 6,370,184 | B1 | 4/2002 | Hellberg |
| 6,496,533 | B2 | 12/2002 | Lennen |
| 2001/0053177 | A1 | 12/2001 | Papasakellariou |

FOREIGN PATENT DOCUMENTS

EP          1128565 A2     8/2001

* cited by examiner

*Primary Examiner*—Dac V. Ha
(74) *Attorney, Agent, or Firm*—Brian M. Mancini; Lawrence J. Chapa (57) ABSTRACT

A programmable correlator for a communication system includes an input queue coupled with an analog-to-digital converter (ADC). The input queue includes a random access memory (RAM) wherein sampled data streams from the ADC are written into the RAM. The input queue has two banks of memory of width 2M. A flexible complex correlator is operable on M samples. The correlator is coupled to read M complex samples out of 2M samples from the input queue. A pseudo-noise (PN) crossbar unit operates to rotate a generated PN code to match a rotation of the input queue data in the complex correlator.

20 Claims, 5 Drawing Sheets

INPUT QUEUE 113

| BANK 0 | | | | BANK 1 | | | |
|---|---|---|---|---|---|---|---|
| 0 | 2 | 4 | 6 | 8 | 10 | 12 | 14 |
| 1 | 3 | 5 | 7 | 9 | 11 | 13 | 15 |
| 16 | 18 | 20 | 22 | 24 | 26 | 28 | 30 |
| 17 | 19 | 21 | 23 | 25 | 27 | 29 | 31 |
| ⋮ | | | | ⋮ | | | |

FLEXIBLE CORRELATION AND QUEUEING IN CDMA COMMUNICATION SYSTEMS

FIELD OF THE INVENTION

The present invention relates generally to receiving signals in a radio communication system, and in particular to correlating signals in CDMA communication systems.

BACKGROUND OF THE INVENTION

Code division multiple access systems such as direct sequence (DS-CDMA) communication systems are for use in cellular telephone systems operating at 800 MHz and in the personal communication system (PCS) frequency band at 1800 MHz. For example, in a DS-CDMA system, all base stations in all cells may use the same radio frequency for communication. Base stations can be uniquely identified in this system by uniquely-assigned spreading codes. Specified pseudorandom noise (PN) sequences or maximal-length linear feedback shift register sequences (m-sequences) are utilized to spread the users data streams. In a quadrature modulated system, one sequence is typically used for the in-phase (I) channel spreading of the I channel symbols and the other is used for the quadrature (Q) channel spreading of the Q channel symbols. Mobile stations in the system possess the same length spreading codes and use them for the initial de-spread of the I and Q channels. In the $3^{rd}$ Generation Partnership Project (3GPP) wideband CDMA (WCDMA) and Global Positioning System (GPS) systems, Gold codes are typically utilized as the spreading sequences instead of m-sequences.

Before the spreading on the I and Q channels, the symbols for transmission are typically spread using a process known as Walsh or Orthogonal Variable Spreading Factor (OVSF) code covering. When in a call, each mobile station is assigned a unique Walsh or OVSF code by the base site to ensure that transmission to each mobile station within a given cell is orthogonal to transmission to every other mobile station, assuming that a different Walsh or OVSF code is used for each mobile station. In this manner, channels are established for two-way communication between a base station and a mobile station. For example, the mobile station synchronizes to the base station by correlating the received data to a unique Walsh and PN code. Other codes can be used such as Gold, Barker and Kasami codes, and all codes can be used in combination in general.

Typically, mobile stations use a correlator as a receiver searching element to search for the pseudo-noise (PN) code phases of the receivable signals. Knowledge of the correct I and Q channel spreading code PN phases of the base station(s) with which the mobile station communicates allows the coherent detection of all the other code channels transmitted by the base station. Typical DS-CDMA mobile station receivers utilize a rake receiver having three or more independently controlled fingers, which are time aligned to the correct PN sequence phases determined by the receiver phase searching element.

The rake fingers include a receiver searcher and demodulator that mainly comprise a correlator. The correlator multiplies a data stream with the pre-defined PN code sequences (using the sequence as a key to either invert or not invert the data elements) and integrates (or sums) the result to provide a decoded (despread) signal. The central idea being that only the holder of the proper PN sequences (or code phases) will know the proper sequences to successfully sum the seemingly random data patterns to reach a conclusive data symbol decision. This process of inverting of data according to PN sequences and summing is generally termed correlation. However, with the proposed series of next generation CDMA and Global Positioning System (GPS) communication systems, several different correlator hardware configurations would be needed to accommodate all of the proposed systems. For example, wideband CDMA systems can present varying spreading codes and chip rates that need to be accommodated.

Existing correlation techniques generally include one of two types. A first type includes using a dedicated hardware correlator implemented on an application specific integrated circuit (ASIC) as needed for a particular application, as just described. While some optimization can be carried out to reuse some of the correlator operational blocks to minimize the overhead, any slight change in the mode of operation typically requires a change in hardware to adjust any one of several parameters (e.g., spreading code, correlator length, data types, etc.).

A second existing correlator type provides for an adjustable correlation length. However, this type of correlator is still dependent on a particular air interface and therefore limited by the PN generator unit included with the hardware. Moreover, this type of correlator includes communications standard-specific memory holding places.

Accordingly, what is needed is a single, programmable general purpose CDMA processor that can search, receive, and track any (or multiples) of the signals generated by the several existing and next generation CDMA communication standards. These types of special purpose processor architectures are often termed applications specific processors. It would also be of benefit to provide processing without the limitation of specific register/memory holding places (as in typical hardware or ASIC structures). Additionally, it would be an advantage to accomplish this without the expense of different or additional hardware in the communication device (along with its concurrent cost).

DETAILED DESCRIPTION OF THE PREFERRED EMBODIMENTS

The present invention provides an apparatus and method for programmable CDMA processing that can search, receive, and track any or multiples of signals generated by various next generation and existing CDMA communication standards. This is accomplished on a universal hardware structure and only requires software uploads to address the needs of the particular CDMA air interface used in the communication system. The particular invention disclosed here is a component of such a flexible microcoded CDMA processor allowing for a programmable correlation or despreading of the incoming signals, and equally programmable input queue architecture which allows for many independent signal sources, sample widths (precisions), over-sampling rates, and sample clocks. The input queue then typically feeds the captured data to the programmable correlator unit for specialized processing. Input sources are typically fed into an input device (or input register) in the described processing architecture, and typically supply data from analog-to-digital converters (ADCs), or other preprocessing components (e.g., digital channel filters, etc.) in general. Multiple input sources (e.g., channels) can be utilized to support multiple communications standards, multiple antennas (e.g., diversity), and the like.

In particular, the present invention provides a programmable correlator and input queue, operable in accordance with an included general purpose microcoded engine with centralized register files capable of holding any code or system specific information to a longer term storage unit called the operand memory. Note that all processors operate from some type of microcoded instructions, as is well known in the art. The microcode (or instructions in memory) is applied as necessary in the described invention for operation in any particular CDMA environment. Note that the controlling microcode can exist in random access memory (RAM) technologies, read-only memory (ROM) technologies, or can be generated by another device (e.g., processor). Furthermore, the microcoded engine optionally includes an arithmetic logic unit (ALU) under microcode control from the programmable processor, which could also include other helper ALUs into its architecture to improve the flexibility unit beyond that of a co-processor (more towards that of a general purpose digital signal processor or DSP).

The invention will have application apart from the preferred embodiments described herein, and the description is provided merely to illustrate and describe the invention and it should in no way be taken as limiting of the invention. While the specification concludes with claims defining the features of the invention that are regarded as novel, it is believed that the invention will be better understood from a consideration of the following description in conjunction with the drawing figures, in which like reference numerals are carried forward. As defined in the invention, a radiotelephone is a communication device that communicates information to a base station using electromagnetic waves in the radio frequency range. In general, the radiotelephone is portable and, when used, is typically held up to a person's head, next to their ear.

The concept of the present invention can be advantageously used on any electronic product requiring the transceiving of RF signals, though its application is not limited to such products. Preferably, the radiotelephone portion of the communication device is a cellular radiotelephone adapted for personal communication, but may also be a pager, cordless radiotelephone, or a personal communication service (PCS) radiotelephone. The radiotelephone portion may be constructed in accordance with an analog communication standard or a digital communication standard. The radiotelephone portion generally includes a radio frequency (RF) transmitter, a RF receiver, a controller, an antenna, a battery, a duplex filter, a frequency synthesizer, a signal processor, and a user interface including at least one of a keypad, display, control switches, and a microphone. The radiotelephone portion can also include a paging receiver. The electronics incorporated into a cellular phone, two-way radio or selective radio receiver, such as a pager, are well known in the art, and can be incorporated into the communication device of the present invention. The present invention can be applied to any signal processing problem where a correlation (or dot-product) operation is required, particularly those where one of the data sets is bi-valued.

Figure 1:
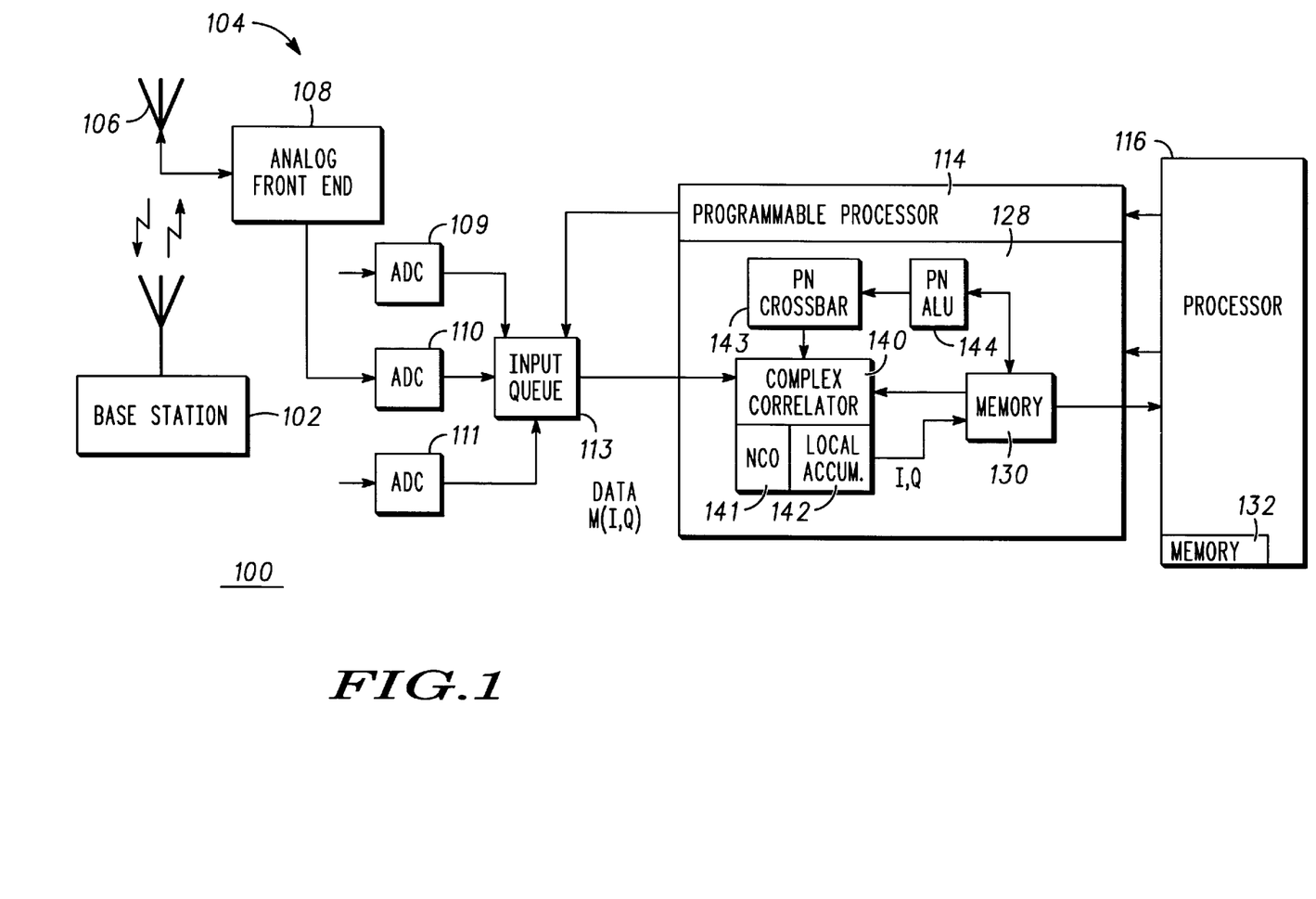
FIG. 1 is a simplified block diagram of a CDMA receiver architecture, in accordance with the present invention.

FIG. 1 illustrates a generalized rake receiver architecture of a CDMA communication device that can utilize the present invention. By way of example only, the communication device is embodied in a cellular radiotelephone having a conventional cellular radio transceiver circuitry, as is known in the art, and will not be presented here for simplicity. The cellular telephone, includes conventional cellular phone hardware (also not represented for simplicity) such as user interfaces that are integrated in a compact housing, and further includes an antenna system, in accordance with the present invention. Each particular wireless device will offer opportunities for implementing this concept and the means selected for each application.

In general, the communication system 100 includes a plurality of base stations such as base station 102 configured for radio communication with one or more mobile stations such as radiotelephone 104. The radiotelephone 104 is configured to receive (and transmit) code division multiple access (CDMA) signals to communicate with the plurality of base stations, including base station 102 over one or more of the available CDMA communication standards. In this example, the communication system 100 operates according to TIA/EIA Interim Standard IS-95, "Mobile Station-Base Station Compatibility Standard for Dual-Mode Wideband Spread Spectrum Cellular System," operating at 800 MHz. Alternatively, the communication system 100 could operate in accordance with other CDMA systems including PCS systems at 1800 MHz.

The base station 102 transmits spread spectrum signals to the radiotelephone 104. During communication the symbols on the traffic channels are spread using a pseudorandom noise (PN) and Walsh code in a process known as Walsh covering, as is known in the art. Each mobile station such as the radiotelephone 104 is assigned a unique Walsh code by the base station 102 so that the channel transmission to each mobile station is orthogonal to channel transmissions to every other mobile station. The spread signals are quadrature phase shift keyed (QPSK) modulated to form in-phase (1) and quadrature-phase (Q) signals. The I and Q signals are each spread using two specified PN sequences. The same I and Q spreading sequences are used by all base stations in the communication system 100. Higher M-ary modulation schemes such as 8-PSK, 64-QAM, 256-QAM, and the like can also be input. In addition, different rates of codes (i.e. number of chips per bit (symbol) can be accomodated).

The radiotelephone 104 comprises an antenna 106, an analog front end 108, a receive path including at least one input device such as an analog-to-digital converter (ADC) 110, programmable processor 114 with programmable correlator 128, and a controller or processor 116, such as a DSP with call processor, for example. Optionally, other receiver input paths can be included, such as in a multi-antenna system, for diversity, or in a multi-mode system, for example, shown as ADC 109 and ADC 111, for example. Any or all of the ADCs can provide oversampling to provide sub-chip samples. The antenna 106 receives RF signals from the base station 102 and from other base stations in the vicinity. Some of the received RF signals are directly transmitted, line of sight rays transmitted by the base station. Other received RF signals are reflected rays and are delayed in time. Received RF signals are converted to electrical signals by the antenna 106 and provided to the analog front end 108. The analog front end 108 filters the signals and provides conversion to baseband I and Q signals. The baseband I and Q signals are provided to at least one ADC 110, which converts them to streams of I and Q digital data which are passed to an input queue 113, under control of the programmable processor 114, for further processing.

The main processor 116 controls the general functions of the radiotelephone 104. Preferably, the processor 116 is a digital signal processor or microcontroller. The processor operates in response to stored programs of instructions and includes a memory 132 for storing these instructions and other data. Of course, the processor is coupled to other elements of the radiotelephone 104. Such connections are not shown so as to not unduly complicate the drawing figure. The programmable correlator block 128 is operable to receive, search and track, and is typically a sub-part of a programmable processor 114, which is operable in CDMA, WCDMA and GPS systems by utilizing different sets of microcode. A memory 130 is included that can be random access or read-only and is usable for data storage and storage of instructional microcode. The input queue 113 is under the control of the programmable processor 128, which also controls the flexible correlator 128 so that the data to be correlated can be controlled via software microcode. Alternatively, a separate memory can be provided to store the microcode. In either case, the microcode memory block is connected to all the programmable sub blocks (i.e. PN crossbar unit, PN ALU, complex correlator, and input queue memory) to control their behavior, although these connections are not show to simplify the drawings.

In practice, the main processor 116 can send the programmable CDMA processor 114 a task oriented message, such as "perform a 3GPP phase 1 search". In standard embodiments of the invention, the main processor 116 will either give the programmable processor 128 a jump pointer (or vector) to an instruction which is already in an instruction memory 130 of the processor 114, or load the new instructions into the memory 130. Once an instruction is resident or is loaded into the programmable processor 114, it is relatively autonomous, in that managing the input queue 113, programmable correlator 128 and such are all performed by the programmable processor 114 and not the main processor 116.

Typically, the DS-CDMA receiver initially operates in a system acquisition mode, where it acquires all of the desired incoming spread spectrum signals (including multipath signal components), then it operates in a tracking mode, in which it monitors multipath signal profiles and demodulates incoming data channels. Acquisition typically involves detecting a pilot spreading sequence from one or more sources. Demodulation of incoming data channels typically involves correlation tasks such as pilot and/or Walsh/OVSF code correlation (or data symbol despreading), delay locked loop (DLL) correlations, and frequency locked loop (FLL) correlations. Multiple active code channels or multiple base stations increase the need for all of these basic correlation operations.

Traditional rake receiver fingers, as are known in the prior art, are unnecessary in the present invention as the programmable correlator block can act as a receiver finger or searcher, by accessing the correct data from the input queue and correlating with the correct PN phase. In addition, the present invention can perform early/late correlation by either shifting data or shifting the PN sequence under microcode (software) control. Moreover, the programmable processor can run faster than the chiprate (real-time), so that the correlator can correlate over multiple data sequences (to get early, on-time, late finger correlation information, multipath ray signals, etc.) before the next set of sample data comes in. Typically, the programmable correlator and processor architecture is capable of processing several chips or samples of data per clock or instruction cycle. These simultaneous (or parallel) operations allow a very high processing throughput to be achieved with the present invention.

The programmable processor 114 includes a correlator 128 with a memory 130 or register file. The analog front-end 108 detects signals received by the radiotelephone 104 from the plurality of base stations including the base station 102 in one example. The programmable processor 114 includes a correlator 128 with a memory 130 or register file. The correlator 128 compares a detected data sample (PN) sequence received from the ADC 110 and predetermined (system-specific) PN sequences, which can be stored in the memory 130 or fed from a PN generator, and produces a demodulated data stream for the main processor 116. In the illustrated embodiment, the correlator 128 includes a PN arithmetic logic unit (PN ALU) 144, PN crossbar unit 143, and a programmable complex correlator 140 with numeric control oscillator (NCO) 141 and local accumulator 142.

The programmable correlator 128 receives the I and Q streams of data from the ADC 110. The sample data correspond to the modulated spread spectrum signal received from the base station 102 in this example, including directly received or initial rays and reflected rays having a time delay. In addition, the data can correspond to modulated spread signals, direct and reflected, received from other base stations in the communication system 100. The data can include the PN sequences and Walsh codes used for spreading the I and Q channels at the base station 102 and at all other base stations.

The correlator 128 compares the detected I and Q sample sequences with predetermined PN sequences which can include Walsh or OVSF codes. Generally, the predetermined PN sequences are exclusive-OR'ed with the Walsh or OVSF codes in the receiver, prior to correlating the sequences with the incoming sample data. These sequences can be pre-generated by the PN ALU 144 and stored in the short term memory or register file 130 or fed directly into the programmable correlator 128. Note that the PN generation unit 144 could generally be hardware (ASIC) based, or software (microcode) programmable. The predetermined PN sequences correspond to a portion of the short PN sequences used to spread the I and Q channels at all base stations in one example. The radiotelephone 104 includes a storage element such as the memory 130 or the memory 132 that can store a fixed pattern of PN values, or the values can be generated as needed. However, it should be recognized that a single memory can be used and is preferred. The predetermined PN sequence includes the fixed pattern that comprises a predetermined number of chips of a PN sequence, for example the 512 last chips of a PN sequence such as the short PN sequence.

The receiver searcher 114, under control of the processor 116, examines the stream of received data provided by the ADC 110. The data can include detected PN signature sequences corresponding to spread RF signals received from one or more base stations, such as base station 102. In the illustrated embodiment, the signals are quadrature modulated, with each of the signals including in-phase (I) symbols and quadrature-phase (Q) symbols. The I symbols are spread using an I PN sequence and the Q symbols are spread using a Q PN sequence. The complex correlator 140 compares detected PN sample sequences and a predetermined PN sequence to capture the energies of all receivable base transmissions (i.e., spreading code phase) during a predetermined time duration. The preferred predetermined time duration for an IS-95 DS-CDMA communication system such as communication system 100 during acquisition mode is 26⅔ milliseconds, which is the time required for repeat of all phases of the PN sequences used to spread the I and Q channels. The correlator 140 can include an I channel correlator for the I channel and a Q channel correlator for the Q channel, combining the outputs of the two correlators for improved accuracy. The programmable correlator can include a task or instruction register (not shown) which contains a microcode instruction set from the processor 116.

A novel aspect of the present invention is the use of a programmable correlator 140 capable of correlating M chips and N phases per clock cycle, and a flexible input queue 113 capable of storing streams of data from many A/Ds at many different sampling clock rates, in order to provide the captured sample data to the correlator 140 in an intelligent manner. Optionally, a small PN crossbar unit 143 is included which will re-order in time (or rotate) the PN sequence generated by the PN ALU 144 to match the time sequence (or rotation) of the input queue sample data sequence to guarantee that the correct PN is being applied to the correct data from the input queue. In effect, this provides a re-ordering in time of a generated PN code sequence to match a time sequence of the input queue data in the correlator. This approach significantly reduces the hardware complexity (and implementation cost) of the input queue. Advantageously, the programmable correlator 140 inherently has an intelligence over a prior art hardware correlator in that the amount of correlation, the frequency adjustment of correlation, the type of correlation that is being performed, the seeding of the accumulator or PN code value before proceeding with a regular correlation can all be controlled via microcode. Also, with this novel approach, it is possible to correlate any number of chips, even those not evenly divisible by M, by using a masking capability of the flexible correlator, as described below. Equally important to the present invention is the ability of the flexible input queue 113 to pick out the correct M consecutive samples of data to correlate based on sample precision, oversample rates, and the desired sampling phase.

Figure 2:
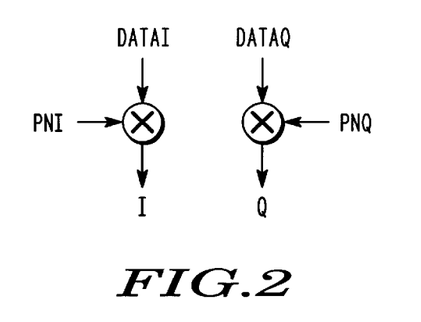
FIG. 2 is a simplified block diagram of a 1-chip real correlator embodiment.

The complex correlator 140 is a parallel correlator that operates on M samples of the data from the flexible input queue 113 that are typically spaced a full chip apart and correlates with M chips of a (possibly) complex PN sequences generated by either a flexible microcoded PN generator such the PN ALU 144 or even a dedicated hardware PN generator. The heart of the complex correlator 140 is M one-bit functional units as shown in FIG. 2, which are assembled in a complex correlator configuration of FIG. 3. It should be noted that in FIGS. 2–4 the multiplier blocks can also be replaced with inverting or non-inverting blocks. The programmable correlator 140 can perform the following two correlation operations on each sample of the input data stream to determine a partial correlation result (also termed the dot-product sum or sub-correlation value), Iaccum+J*Qaccum:

(DataI*PNI)+(DataQ*PNQ)+j((DataI*PNQ)−(DataQ*PNI))+Iaccum+j*Qaccum (DataI*PNI)+j(DataQ*PNQ)+Iaccum+j*Qaccum where DataI=Real part of the data from the input queue, DataQ=Imaginary part of the data from the input queue, Iaccum=Real part of coherent accumulation, Qaccum=Imaginary part of coherent accumulation, PNI=Real part of the generated PN sequences, and PNQ=Imaginary part of the generated PN sequences. A longer correlation operation is typically made up of these smaller dot-product or sub-correlation operations. The first equation provides complex correlation (refer to FIG. 3) with cross-correlation products and is generally used. For example, cross-correlation on at least one real and at least one complex sequence. In certain cases, instead of a complex correlation, it is desireable to keep the imaginary data and real data separated without cross contamination, as if the two channels are carrying two independent real channels. The second equation provides such correlation (refer to FIG. 2) in the present invention. Optionally, (referring to FIG. 4) in cases of correlating only real PN sequences, there exists PN space on imaginary side of the datapath to perform more than M chips of correlation per clock cycle. In fact, by subdividing the data (reducing the data width by half), such as in a scalable single instruction multiple data (SIMD) fashion, it is possible to increase the number of chips of correlation from M chips to 2M chips for an extra performance boost. Such real mode correlation can be used to advantage in particular cases such as in the Global Positioning System (GPS), certain Walsh correlations, and certain channel synchronization modes in the Third Generation Partnership Project (3GPP). All of these modes of operation are controllable by software, via the microcode.

Figure 5:
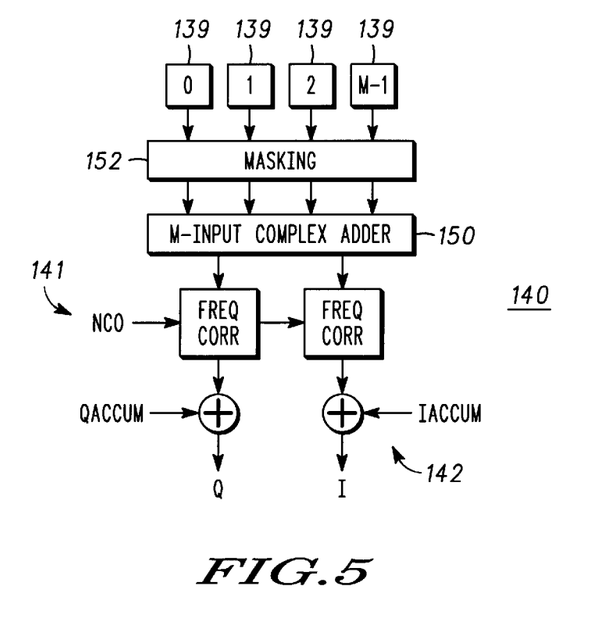
FIG. 5 is a simplified block diagram of complex correlator of FIG. 1.

The present invention utilizes M one-bit functional units (as shown in FIG. 5) effectively operating in parallel. Note that these functional units can be advantageously implemented in efficient hardware structures, such as those using carry save adders (CSAs) or Wallace tree structures. M defines the number of functional units used to get a proper clock rate of the data. M can be fixed once a CDMA operating system and required processing throughputs are determined, or it can be variable (though it generally must be less than M) to accommodate changing data rates. Alternatively, M can be fixed and correlators can be masked to use less than the M samples in the correlation, as needed, (e.g. for changing data rates in WCDMA or wireless local area network systems).

Referring to FIG. 5, the results of the applicable equations (above) for each of the M one-bit functional units 139 are masked as needed in a masking unit 152. Normally, the masking in transparent, and controlled by the microcode. However, if the number of data samples to correlate is not an even multiple of M, such as in the 802.11 wireless local area network (WLAN) system, a user definable masking 152 can be applied to discount the effect of extra or non-necessary data being summed in the correlation. In either case, the correlated data from each of the correlators 139 is then added in a final complex addition stage 150 in the correlator.

A further novel aspect of the present invention is the inclusion for at least one local programmable numerically controlled oscillator (NCO) 141 in the correlator 140 to provide a coherent frequency offset correction for the I and Q accumulation of the M sub-correlated samples. This is achieved in the present invention by the rotation (or complex multiplication) of the partial correlation (or sub-correlation)

results. Note that the precision of the required frequency correction (e.g., sin and cos output) values is quite low (typically 1–2 bits) for many typical applications, which makes the implementation of the complex multiplier simple or even trivial. Each NCO can be implemented as a multi-bit counter (similar to modulo offset address registers found in typical DSPs), which is utilized to compute the ongoing phase of the frequency offset correction source, or local oscillator, as is well known to those skilled in the art. Note that the implementation of multiple frequency corrected programmable correlators is relatively simple in hardware, and can result in a direct speed-up in correlation processing for multiple frequency offsets. The additional correlation results (from each of the possible or hypothesized frequency offsets) are typically stored in separate accumulation registers.

Frequency correction can have particular advantage in communication systems requiring frequency and phase correction during coherent correlation operations. In certain situations, such as in the GPS and other systems, it is desireable to track the possible frequency rotation of the modulated signal constellation during longer correlations by pre-rotating the PN sequences to a predicted frequency error during coherent correlations. This is possible through the use of a local NCO in the correlator influencing a final complex conjugate multiplication. Thus, the desired frequency correction is applied to a group of M-samples (e.g., the programmable correlator's dot product or sub-correlation result) at once. The step size of the NCO counter is set to be proportional to the expected frequency offset of the incoming sample sequence, and the output of the counter is decoded to determine the traditional sine and cosine waveform values used in the complex multiplication process. Advantageously, the NCO frequency offset correction value is applied after the M-chip correlations have been combined, which requires much less hardware than other traditional techniques (such as applying the frequency offset correction values to the incoming sample sequence). The described technique also re-uses the programmable correlation (i.e., dot-product) hardware for multiple simultaneous frequency adjusted correlations.

Figure 6:
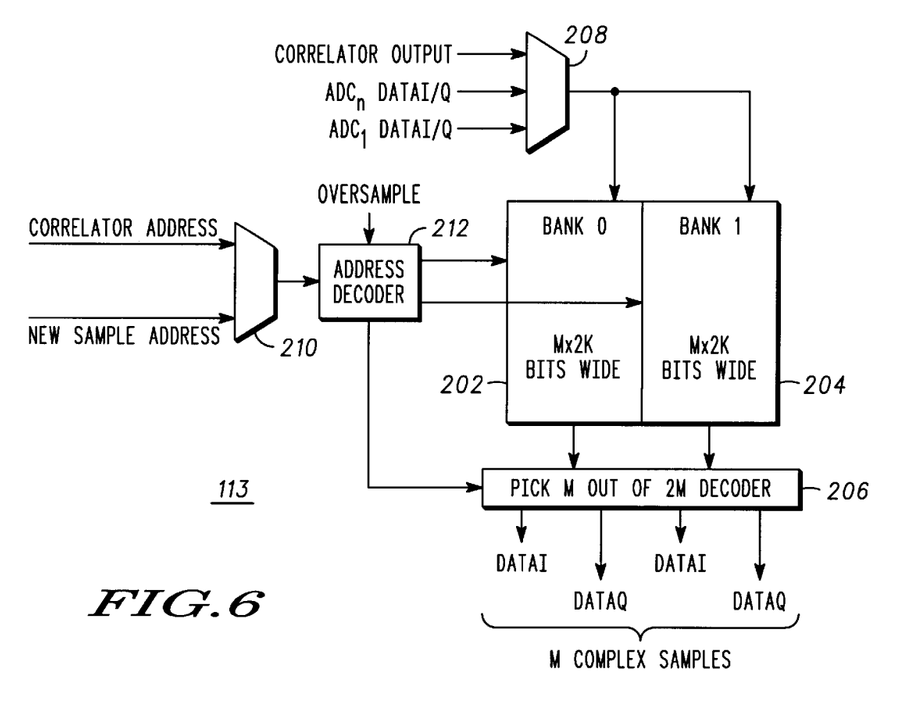
FIG. 6 is a simplified block diagram of the input queue of FIG. 1.

The above advantages of processing multiple chips per instruction or clock cycle are made possible by the flexible input queue 113, as represented in FIG. 6, to feed the programmable correlator 140. Typically, the I and Q samples can be packed into the same basic memory location, though other (separated) data arrangements are possible. The key to providing M samples of data to the correlator is to store the incoming data in a first bank 202 and a second bank 204 of random access memory (RAM). Each bank is at least M×2K bits wide, where K is the number of bits in each real and imaginary data sample (often determined by the ADC resolution) and M corresponds to the number or correlation operations (in chips per instruction or clock cycle) needed for the desired or required processing throughput. For example, if M=4 then each bank will conceptually have four columns of samples in each row, though each row may be made of a single memory location. The RAM is allocated dynamically at system initialization (under software control) and depends only on which CDMA system is being used. Typically, at least one ADC (such as 110 in FIG. 1) supplies I and Q sample data to the input queue filling both banks. As illustrated this is done from left to right and top to bottom. If more than one ADC (such as 109,111 in FIG. 1) supplies data to the input queue, the input queue is filled first with the samples from one ADC, followed by samples from another ADC, etc. Once filled, the RAM can be written over from the first address, in a first-in first out (FIFO) manner. The use of other buffering schemes is possible, such a double buffering, and is in no way limited by the present invention.

Optionally, the programmable correlator can write correlation output data results to the input queue, which are typically used later for multi-stage correlations. In other words, sample data can be read out from an address in the input queue corresponding to a particular sampling phase and time offset, correlated, and written back to the input queue at the same or different address for subsequent re-correlation. All of these storage parameters (e.g., data locations, oversample rates, etc.) are under software or microcode control. The input data stream is controlled by a multiplexer 208 under direction by either the correlator or processor. The address of the new sample data or correlator output data is controlled by respective new sample address and correlator address control lines, which address a row of the input queue. These are multiplexed by multiplexer 210 depending on whether new sample data or correlator output data is to be written into the queue. An address decoder 212 then determines which column of the input queue to write to, depending on the oversample rate and sample precision.

Figure 7:
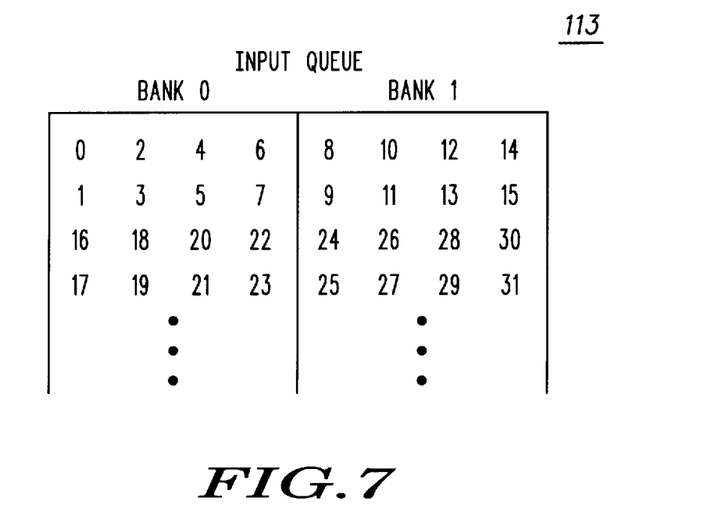
FIG. 7 is a graphical representation of a data sample of the input queue of FIG. 6.

FIG. 7 shows an example of the first 32 new samples of an input data stream loaded into an dual-bank input queue with M=4 and oversample rate=2 (i.e. twice the chip rate). In this case, each chip of data would have two samples (e.g. 0,1) placed in a column (the first column) of the input queue. The next two samples (e.g. 2,3) are placed in the next column (the second cloumn), etc. Given that M=4 and there are two banks, then sixteen samples will be placed in the first two rows of the input queue. The seventeenth samples starts over in the first cloumn again, but in the next row (the third row). The address decode block (212 of FIG. 6) directs this placement of incoming samples into the queue. If instead there was 4× oversampling employed in the system, for example, then the first four entries in the first column would contain samples 0–3, the next column contains samples 4–7, etc. until the first four rows are filled with 32 samples, which then repeats. Therefore, the oversample rate ultimately defines the input queue mapping. Typically, each sample contains either I or Q data, with various arrangements possible in the input queue. However, it should be noted that if only real mode correlation is used, the unused Q sample space can be filled with real data, and the input queue can be subdivided to use the equivalent 2M correlators effectively. Alternatively, if only half the incoming sample resolution is needed, 2M packed data samples can be utilized.

Figure 3:
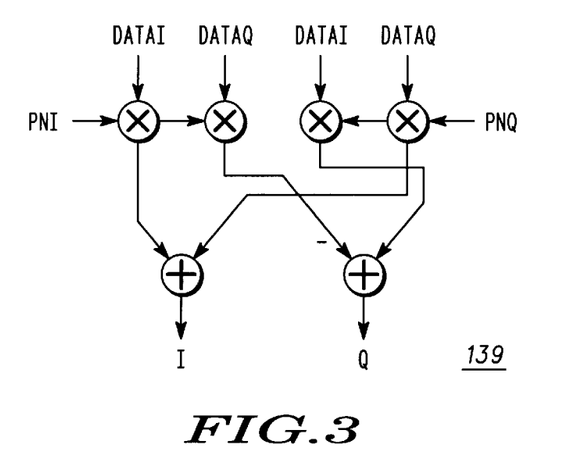
FIG. 3 is a simplified block diagram of a 1-chip complex correlator embodiment.
Figure 4:
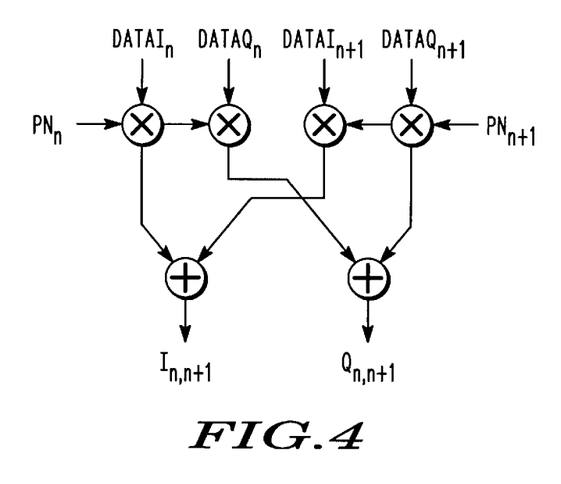
FIG. 4 is a simplified block diagram of the correlator of FIG. 3 used for real-mode correlation, in accordance with the present invention.

In order to read data out of the input queue, data is selected by a decoder 206 for forwarding to the correlator (such as one of FIGS. 2–4). Once again, the addresses of the data to be read out are supplied by either the new sample address or the correlator address (if data is to be re-correlated) under control by microcode. Knowledge of the oversample provides column locations which is fed to the decoder 206 by the address decoder 212. The storage technique of the present invention provides 2M consecutive samples of the input data addressed using the two banks of RAM. In this way, the two banks provide the advantage of needing only two row addresses, provided by a single address pointer and the decoder 212 to read in correlator data. For example, the M correlators can be input with samples {0,2,4,6}, samples {2,4,6,8}, samples {4,6,8,10}, or samples {6,8,10,12}; all address with only a single address pointer. Then, when the data does not wrap around memory locations, the two addresses will be the same. If the data does wrap around, the address for bank 1 will be different than that of bank 2. Without the benefit of the dual bank input queue, a multi-read port RAM would be needed, which is much more costly to implement in hardware.

In practice, the single address pointer points to the start of M samples of input data from the two banks of memory. The decoder 206 provides addresses for each bank to provide a finer resolution by picking out the proper M consecutive sequences out of the 2M samples, which is in effect a multiplexing of corresponding columns from each bank. The proper addresses of the RAM to be read are determined by the address provided by the microcode of the programmable correlator or processor. The dual bank embodiment of the present invention allows the use of a one write port, one read port RAM and a storing technique that guarantees that no two (column) addresses are simultaneously accessed per bank of RAM, which eliminate memory resource conflicts (i.e. hence a minimal number of separate RAMs are used to implement the input queue).

The storing technique takes into account the oversample rate of the input data and sample precision to allow for an M or 2M consecutive full chip selection. That is to say, the microcode can choose to start at any over-sample position within a full chip of data and pull out M or 2M samples all separated by the a full chip length in order to obtain samples at the same sampling phase within a chip. Furthermore, the input queue can be segmented in software to accept data samples from many different input sources (e.g., ADCs) which can be placed at different addresses of the input queue depending on the source. This capability makes possible for multiple antenna diversity demodulation as well as simulataneous receive of two completely different communications systems, such as GPS and 3GPP WCDMA.

The M samples from the RAM must be properly ordered in time (or rotated) for correct alignment of the samples in chronological order. Preferably, this is accomplished with much lower implementation costs by sending the data directly to the correlator as described and re-ordering (or rotating) the PN chip sequence instead of the data samples, which requires less hardware to implement. The PN chip sequence is re-ordered in time (rotated) in a PN crossbar unit, which operates similarly to a barrel shifter, in order to match the time sequence of the data samples provided to the programmable correlator by the input queue. This allows for much lower gate count implementations since it is easier to rotate single-bit PN chip (+/−1) data than it is to rotate 2K-bit data values as needed, both of which can be complex-valued. Alternatively, the data samples can be re-ordered or rotated directly from the input queue using an input data crossbar unit.

Figure 8:
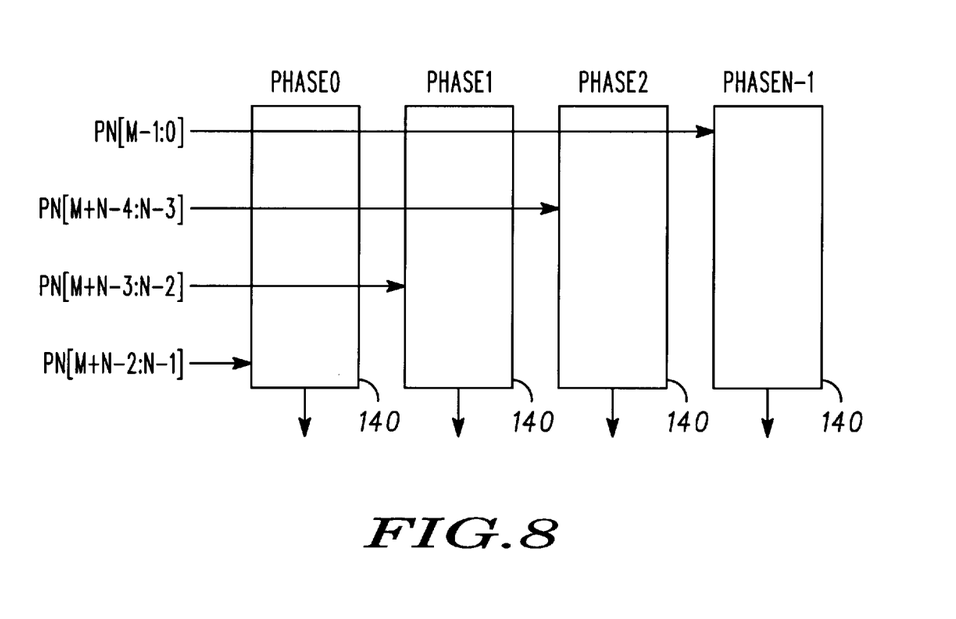
FIG. 8 is a simplified block diagram of phase correlation, in accordance with the present invention.

In a preferred embodiment, the present invention provides a further processing throughput performance gain by programmably correlating against multiple (N) different code phases of the PN sequence (and accumulates multiple sums) simultaneously, as shown in FIG. 8. To sweep the different code phases of correlation, one needs to either provide extra sets of sample data to correlate upon given a set of PN sequences, or extra set of PN code sequences given a set of sample data. In this embodiment, N phases are correlated and require the use of N complex correlators 140. The only limit to this approach is on the tolerable amount (e.g., die size) of the required hardware. The same sample data set is used for each of the correlators with multiple shifted PN code sequences in the preferred embodiment, since this approach utilizes much less hardware than the alternative approach described above. The preferred realization of parallel correlation of N code phases is to provide a single set of data, and sweep the phases using extra (e.g., shifted) PN sequences. This burdens the PN generators to now generate M+N−2 consecutive bits of a PN sequences so that the correlators can take advantage of the additional PN code sequence data. In many cases, this extra PN information is readily attainable. For each of the correlators the same PN ALU, PN crossbar and frequency correction (NCO) structures can be used in common, or individually, which expands the processing throughput even further. Preferably, a separate local accumulator is used with each of the N complex correlators (and each of the individual frequency corrected correlation results). Thus, it is possible to process (or correlate) M-chips/data samples per clock cycle, each across N possible code phases, and further each across F frequency offsets (for frequency corrected coherent correlations as described above), theoretically resulting in a M×N×F processing throughput (in chips per clock cycle) in the described processing architecture of the present invention.

Figure 9:
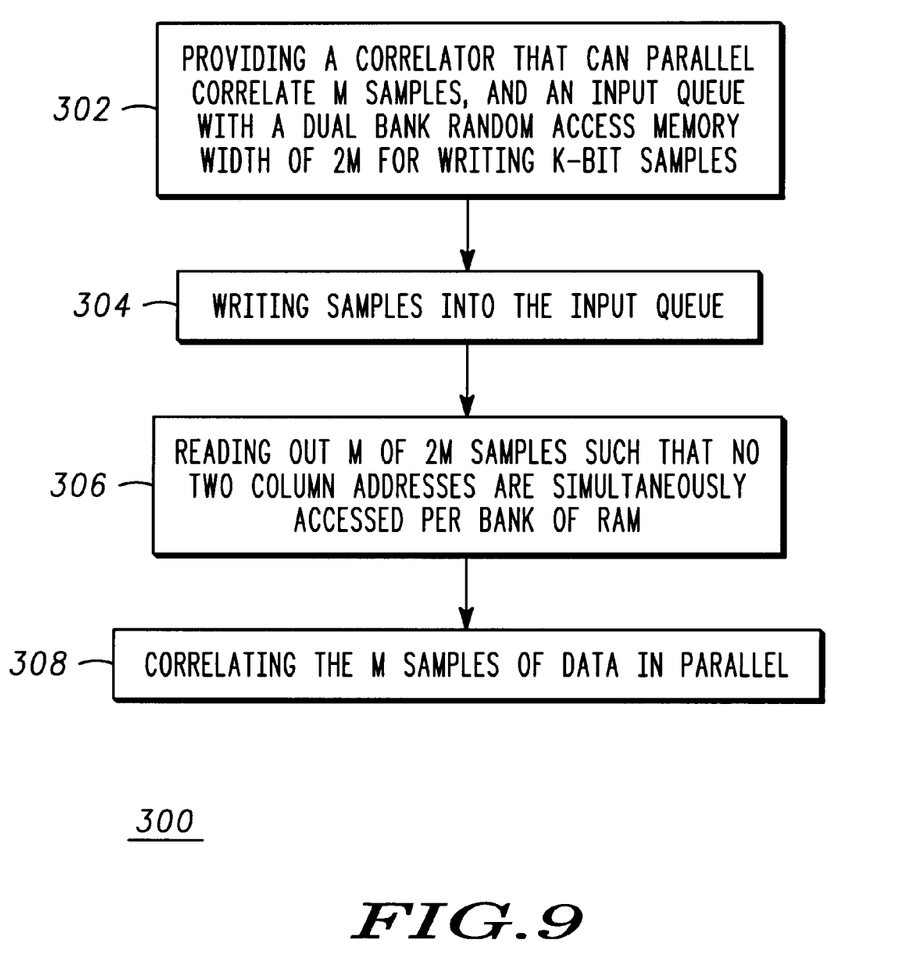
FIG. 9 is a flow chart of a method, in accordance with the present invention.

The present invention also provides a method 300 for software programmable correlation for CDMA communication systems, as shown in FIG. 9. The method includes a first step 302 of providing a programmable complex correlator that can parallel correlate M samples, and an input queue with a dual bank random access memory width of 2M for writing 2K bits for I and Q samples. Preferably, the programmable correlator includes at least one local numerically controlled oscillator (NCO) and frequency correction logic. The NCO provides for frequency offset correction of the dot-product or sub-correlation (I and Q accumulation) values of M data samples simultaneously. A next step 304 includes writing complex samples into the input queue. A next step 306 includes reading out M of 2M samples such that no two column addresses are simultaneously accessed per bank of RAM. A next step 308 includes correlating the M samples of data in parallel.

In practice, the method includes a further step of re-ordering (or rotating) a generated PN code to match a time sequence (or rotation) of the sample data that is supplied to correlator from the input queue. The programmable correlator is a complex correlator that provides parallel complex correlation of M complex samples. Preferably, the correlating step includes operating on N phases per clock cycle. Optionally, the method can include the steps of subdividing the input queue, and wherein the correlation step includes using correlators ordinarily assigned to Q sample correlation for real-mode correlation at twice the throughput levels (by operating on 2M data samples which require half the precision of the M data samples). All of the above described operations are fully under software or microcode control, which results in maximum flexibility of the hardware.

The present invention provides a correlator and memory structure that is flexible to accommodate many existing and proposed CDMA communication systems. This is accomplished by providing an unstructured random access memory for an input queue that can be configured for a particular communication system data architecture. Different sampling rates, data rates, and sample precisions can all be accommodated successfully. The input queue memory adressing has been reduced to a simple one-write,one-read adress port. The surrounding hardware, such as the programmable correlator for example, is also configured to efficiently use this flexible storage technique and multiple operating modes, all under microcode control. The programmable correlator includes at least one local NCO for frequency offset corrected correlations, which is used to advantage in the GPS system, for example. Furthermore, the programmable correlation is capable of correlating data over multiple code phases simultaneously, under microcode control, which also results in a significant increase in processing speed. Moreover, the programmable correlator in the present invention provides masking for those data streams that may not provide enough data samples for all the parallel correlators.

All of these techniques allow a very large number of data samples (or chips) to be processed per instruction or clock cycle, which makes possible full software implementations of CDMA communications systems (which traditionally require hardware structures to implement). Multiple CDMA systems are supported by loading different sets of software control code which all control the same basic set of programmable hardware as described above. The combination of all of these techniques makes possible a high throughput processing engine, which can accommode multiple CDMA systems with reasonable clock rates, minimal hardware implementation costs, and low power consumption.

It is to be understood that the phraseology or terminology employed herein is for the purpose of description and not of limitation. Accordingly, the invention is intended to embrace all such alternatives, modifications, equivalents and variations as fall within the broad scope of the appended claims.

What is claimed is:

1. A programmable correlator apparatus comprising:
    an input queue coupled with at least one input device, the input queue including random access memory (RAM) wherein data streams from the at least one input device is written into the RAM, the input queue having two banks of memory having an aggregate width 2M; and
    a programmable correlator operable on a number M samples simultaneously, the correlator coupled to read M samples out of 2M samples from the input queue.

2. The apparatus of claim 1, wherein each bank of the RAM is at least M×2K wide, where M is the number of samples read into the correleator and K is the number of bits in each real and imaginary data sample.

3. The apparatus of claim 1, wherein the programmable correlator is also operable on a number N code phases per instruction cycle.

4. The apparatus of claim 1, wherein the correlator further including at least one local numerically controlled oscillator to provide frequency correction for the in-phase (I) and quadrature (Q) accumulation of the M samples.

5. The apparatus of claim 1, wherein the input queue is subdivided and the input data width is reduced by half to provide simultaneous correlation on 2M samples.

6. The apparatus of claim 1, wherein the input queue can store data streams having different sampling clock rates from associated input devices.

7. The apparatus of claim 1, further comprising a pseudo-noise (PN) crossbar unit, the crossbar unit operable to reorder in time a generated PN code sequence to match a rotation of the input queue data in the correlator.

8. The apparatus of claim 1, wherein the correlator is configurable to operate using one or more of correlation on complex samples, cross-correlation on at least two complex sequences, cross-correlation on at least one real and at least one complex sequence, and correlation on real samples.

9. The apparatus of claim 1, wherein the input queue is a one write port, one read port input queue and is operable using a single sample address.

10. A programmable correlator apparatus comprising:
    an input queue coupled with at least one analog-to-digital converter (ADC), the input queue including random access memory (RAM) wherein sampled data streams from the at least one ADC is written into the RAM, the input queue having two banks of memory, wherein each bank of the RAM is M×2K wide, where M is the number of samples read into a correlator and K is the number of bits in each real and imaginary data sample;
    a programmable complex correlator operable on M samples, the correlator coupled to read M complex samples out of 2M samples from the input queue; and
    a pseudo-noise (PN) crossbar unit, the crossbar unit operable to re-order a generated PN code sequence to match a rotation of the input queue data in the correlator.

11. The apparatus of claim 10, wherein the programmable complex correlator is also simultaneously operable on a number N code phases per cycle.

12. The apparatus of claim 10, wherein the programmable complex correlator further including at least one local numerically controlled oscillator to provide frequency correction for the in-phase (I) and quadrature (Q) accumulation of the M samples.

13. The apparatus of claim 10, wherein the programmable correlator is configurable to operate using one or more of correlation on complex samples, cross-correlation on at least two complex sequences, cross-correlation on at least one real and at least one complex sequence, and correlation on real samples.

14. The apparatus of claim 10, wherein the programmable correlator includes a masking unit that ignores portions of correlator input data with a number of samples that is different from M.

15. A method for correlation, the method comprising the steps of:
    providing a programmable correlator that can correlate M samples in parallel, and an input queue with a dual bank random access memory (RAM) having a width of 2M for writing a number K-bit samples;
    writing samples into the input queue;
    reading out M of 2M samples such that no two column addresses are simultaneously accessed per bank of RAM; and
    correlating the M samples of data in parallel.

16. The method of claim 15, further comprising the step of re-ordering in time a generated pseude-noise (PN) code sequence to match a time sequence of the input queue data in the correlator.

17. The method of claim 15, wherein the correlating step includes operating on a number N code phases per cycle.

18. The method of claim 15, wherein the providing step includes the correlator having a local numerically controlled oscillator, and further comprising the step of frequency correcting the in-phase (I) and quadratue (Q) accumulation of the M samples.

19. The method of claim 15, wherein the correlation step includes one or more of parallel complex correlation of M complex samples and M complex chips, parallel complex correlation of 2M complex samples and 2M real chips, or real correlation of 2M real samples and 2M real chips.

20. The method of claim 15, further comprising the steps of subdividing the input queue, and wherein the correlation step includes using correlators ordinarily assigned Q sample correlation for real-mode correlation.

* * * * *